US006559407B2

(12) United States Patent

Chancey et al.

(10) Patent No.: US 6,559,407 B2
(45) Date of Patent: May 6, 2003

(54) CATHODE ASSEMBLY FOR AN ELECTRIC ARC SPRAY APPARATUS

(75) Inventors: John Edward Chancey, Grosse Pointe Farms, MI (US); Lawrence Edward Ellis, Dearborn Heights, MI (US); Larry Gerald Gargol, Ann Arbor, MI (US); Srikanth Chinthagunta Reddy, Southfield, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 70 days.

(21) Appl. No.: 09/681,440

(22) Filed: Apr. 5, 2001

(65) Prior Publication Data

US 2002/0144982 A1 Oct. 10, 2002

(51) Int. Cl.$^{7}$ .............................................. B23K 10/00

(52) U.S. Cl. ........................... 219/121.47; 219/121.52; 219/121.48; 219/76.16

(58) Field of Search ........................... 219/76.16, 76.15, 219/75, 121.47, 121.59, 121.52, 121.5, 121.48; 29/592.1

(56) References Cited

U.S. PATENT DOCUMENTS 4,701,590 A * 10/1987 Hatch .................... 219/121.52
4,924,059 A * 5/1990 Rotolico et al.
5,808,270 A 9/1998 Marantz et al.
5,938,944 A * 8/1999 Baughman et al. ...... 219/76.16
6,320,156 B1 * 11/2001 Yamaguchi et al. ..... 219/121.5

* cited by examiner

*Primary Examiner*—Mark Paschall
(74) *Attorney, Agent, or Firm*—Raymond L. Coppiellie

(57) ABSTRACT

A cathode assembly 10 for an electric arc spray apparatus. The cathode assembly 10 utilizes a positive cathode retention design which provides for improved heat management characteristics, quick and easy cathode replacement and increased cathode life. The cathode assembly includes a cathode holder 14, a cathode 12 including a first portion 26 which resides within the cathode holder 14, a tip portion 28 which extends from the cathode holder, and a shoulder portion 33 which is formed on the outer surface of the cathode. The cathode assembly 10 further includes a retention member or nut 16 which removably attaches to the cathode holder 14 and which engages the shoulder portion 33, effective to positively retain the cathode 12 within the holder 14. The retention member 14 also includes an aperture through which the cathode tip 28 extends. The cathode retention member 14 allows for a longer and larger cathode 12 to be utilized and provides an increased amount of heat dissipating surfaces relative to prior designs, thereby increasing the life and improving the performance of the cathode.

21 Claims, 1 Drawing Sheet

CATHODE ASSEMBLY FOR AN ELECTRIC ARC SPRAY APPARATUS

BACKGROUND OF INVENTION

This invention relates to a cathode assembly and more particularly, to a cathode assembly for an electric arc spray apparatus which is designed to provide more secure cathode retention, improved heat transfer management and less cathode erosion, thereby increasing the life of the cathode relative to prior cathode designs.

Electric arc spray apparatuses are used in various applications to apply protective coatings to surfaces such as metal, ceramic and composite surfaces. One type of electric arc spray apparatus includes a cathode and a constricting nozzle which is disposed around the cathode and which emits gas. The cathode is typically connected to a negative terminal of a power supply through a high frequency and/or high voltage generator, and is used to initiate an electrical arc between the cathode and the nozzle. A high velocity jet of gas is directed into a gap formed between the cathode and the nozzle. The gas is ionized and heated as it flows through the gap and is discharged through a small orifice in the nozzle. The orifice directs the heated plasma gas towards the tip of a feedstock metal wire. The plasma arc attaches to or "transfers" to the metal wire, thereby melting the wire. The high velocity plasma jet disperses the molten metal into fine particles which form a spray stream which is directed upon a surface which is desired to be coated. Electric arc spray apparatuses are discussed and described for example in U.S. Pat. No. 5,808,270 of Marantz et al. which is assigned to the present assignee and which is fully and completely incorporated herein by reference.

The cathode used within electric arc spray apparatuses is typically made of tungsten or another durable thermionic emitting material. The cathode is fitted within a cathode holder which is made of another material such as copper or brass. Particularly, in prior apparatuses the cathode is typically retained within the holder by use of a swaging, pressing or brazing process. During operation, the cathode is heated to extremely high temperatures and the holder assists in dissipating heat from the cathode. After extended use, the cathode may crack due to the extreme temperatures and due to the limited heat dissipation provided by the cathode holder. Furthermore, the fitted cathode may also be displaced or expelled from the cathode holder due to repeated thermal cycling (i.e., repeated thermal expansion and retraction), thereby causing total failure of the plasma gun. These extreme conditions may also cause cathode erosion and other damage. As a result, the life of these prior cathodes is typically limited, and they must be replaced relatively frequently, thereby increasing production cost and decreasing efficiency.

There is therefore a need for a cathode assembly for a thermal spray gun which has improved heat transfer management, efficiency, and durability and which will increase the life of the cathode relative to prior designs.

SUMMARY OF INVENTION

A first non-limiting advantage of the invention is that it provides a cathode assembly for use with an electric arc spray apparatus which allows the cathode to have an increased diameter and a longer length for improved heat transfer characteristics, electrical contact and durability.

A second non-limiting advantage of the invention is that it utilizes a positive retention method and cathode design which results in better heat transfer management and less cathode erosion relative to prior cathode assemblies.

A third non-limiting advantage of the invention is that it includes a cathode retention device which prevents the cathode from being expelled from the cathode holder.

A fourth non-limiting advantage of the invention is that it allows the cathode to be relatively quickly and easily replaced.

According to a first aspect of the present invention, a cathode assembly is provided for use in an electric arc apparatus. The cathode assembly includes a cathode holder having a cathode retention cavity; a cathode having a first portion of a first diameter which is disposed within the cathode retention cavity, a second portion having a second diameter and which extends from the first portion, and a shoulder portion; and a retention member which is removably secured to the cathode holder and which includes a first aperture through which the second portion of the cathode extends and a first inner surface which engages the shoulder portion, effective to retain the cathode within the cavity.

According to a second aspect of the present invention, a method is provided for retaining a cathode within an electric arc spray apparatus. The method includes the steps of: providing a cathode holder having a cavity for holding the cathode; attaching the cathode holder to the electric arc spray apparatus; forming a shoulder portion on the cathode; fitting the cathode within the cavity such that a tip portion of the cathode extends from the cavity; providing a generally hollow retention member having a first aperture; and removably securing the retention member to the cathode holder, effective to cause the tip portion of the cathode to extend through the aperture and to cause a first surface of the retention member to engage the shoulder, thereby retaining the cathode within the cathode holder.

These and other features, aspects, and advantages of the invention will become apparent by reading the following specification and by reference to the following drawings.

DETAILED DESCRIPTION

Figure 1:
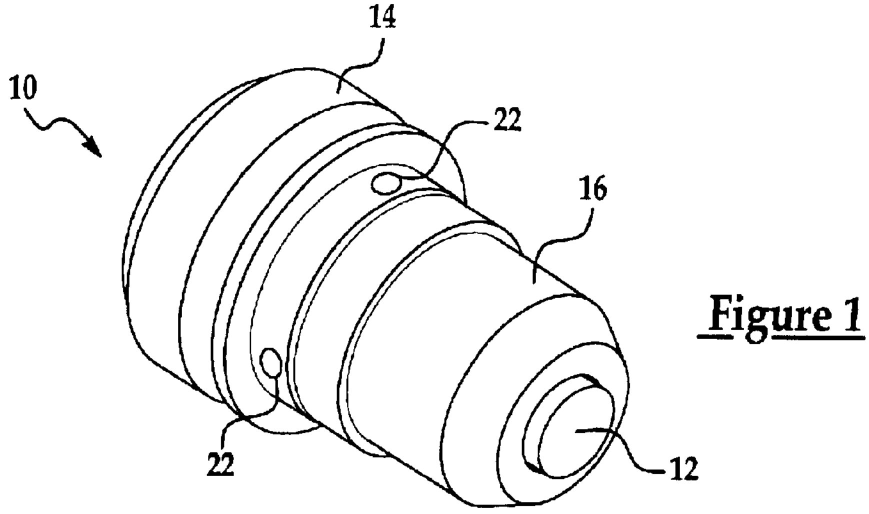
FIG. 1 is a perspective view of a cathode assembly which is made in accordance with the teachings of the preferred embodiment.
Figure 2:
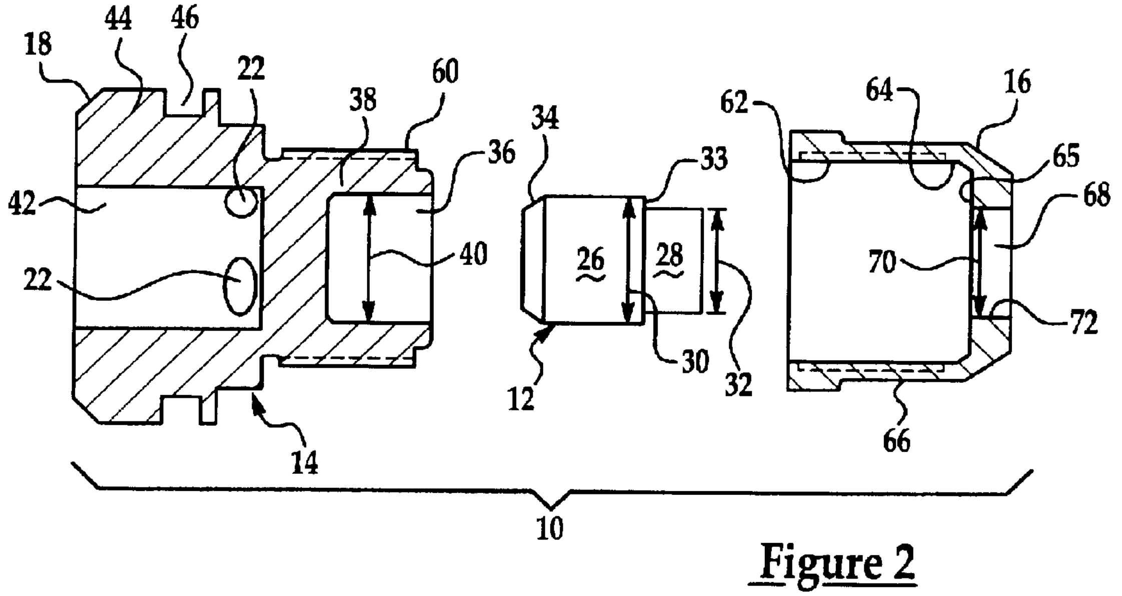
FIG. 2 is an exploded sectional view of the cathode assembly shown in FIG. 1.
Figure 3:
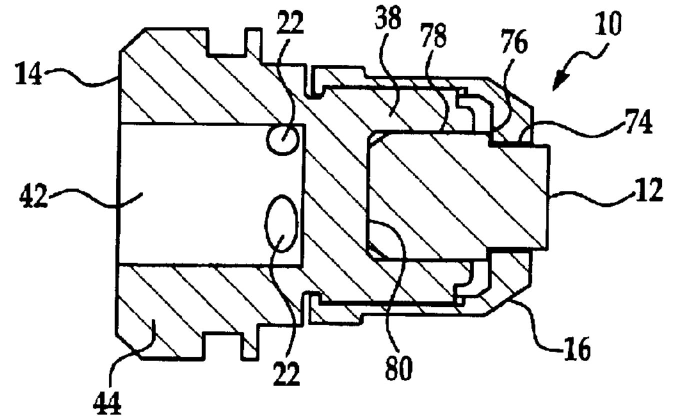
FIG. 3 is an assembled sectional view of the cathode assembly shown in FIG. 1.

Referring now to FIGS. 1–3, there is shown a cathode assembly 10 which is made in accordance with the teachings of the preferred embodiment of the invention and which is adapted for use within an electric arc spray gun (not shown). It should be appreciated that assembly 10 may also be used in other types of thermal spray guns or plasma applications such as plasma cutting, gouging and welding torches.

Cathode assembly 10 includes a cathode member 12 which is disposed or retained within a cathode holder 14, and a cathode retention nut, cap or member 16 which is selectively and threadingly attached to the cathode holder 14. Cathode assembly 10 is adapted to be connected within an electric arc spray gun in a conventional manner. Particularly, cathode assembly 10 may be press-fitted into a portion of an electric arc spray gun in a known and conventional manner.

Cathode 12 is made from a durable thermionic emitting material and in the preferred embodiment is made from tungsten. Cathode 12 is generally cylindrical and includes a first widened or base portion 26 which has a diameter 30, and a narrowed tip portion 28 which extends from portion 26 and which has diameter 32 which is smaller than diameter 30. In the preferred embodiment, diameters 30 and 32 are substantially larger than prior cathode diameters. In one non-limiting embodiment, diameters 30 and 32 range between approximately 3/16" and approximately ¼". Cathode 12 includes a cathode retention ridge or shoulder 33, which in the preferred embodiment of the invention, is integrally formed with cathode 12 at the junction of portions 26 and 28. In other alternate embodiments, annular ridge 33 may be of a different shape and/or may be formed on other portions or outer surfaces of cathode 12. The "bottom" portion of portion 26 includes a tapered or beveled edge 34, which allows the cathode to be easily fitted into the cavity 36.

Cathode holder 14 includes a first generally cylindrical cavity or channel 36 which is formed in the "top" portion 38 of holder 14 and which receives cathode 12. Cavity 36 has a diameter 40 which is substantially similar to diameter 30, thereby allowing portion 26 to fit firmly within cavity 36. Cathode holder 14 is preferably made from a heat dissipating material such as brass or copper, which allows heat generated from cathode 12 to be dissipated to other portions of the gun remote from cathode 12. The top portion 38 of holder 14 includes an threaded outer surface 60 which is adapted to engage threads 62 formed on the inner surface of retention member or nut 16.

Cathode holder 14 further includes a second generally cylindrical cavity or channel 42 which is formed in the "bottom" portion 44 of cathode holder 14 and which selectively receives a pressurized jet of plasma gas from the spray gun. Several substantially identical oval apertures 22 are formed through bottom portion 44 and fluidly communicate with the end of cavity 42. Apertures 22 allow the received plasma gas to be ejected in a tight vortex stream which is emitted from a constricting nozzle (not shown). The outer surface of bottom portion 44 includes an annular recess 46. When cathode assembly 10 is installed within an electric arc spray gun, the bottom portion 44 may be press-fitted within a portion of the gun, and an o-ring (not shown) may be disposed within recess 46, thereby forming a seal between the cathode holder 14 and the gun.

Cathode retention nut or member 16 is generally cylindrical and hollow. Member 16 is made of a heat conducting material with a relatively low coefficient of thermal expansion, and in one non-limiting embodiment, member 16 is made of steel. Member 16 includes threads 62 which are formed on its inner surface 64 and which mate with threads 60, thereby allowing the member 16 to be tightly secured to the top portion 38 of the cathode holder 14. In one non-limiting embodiment, the outer surface 66 of member 16 is hexagonal, thereby allowing the member 16 to be secured to and removed from cathode holder 14 by use of a conventional wrench. In other alternate embodiments, the outer surface 66 may have other shapes or features which allow nut to be easily removed from and attached to holder 14 by use of a suitable tool or device. In other embodiments, threads 60 and 62 may be replaced with other attachment features or devices which allow member 16 to be securely and removably attached to cathode holder 14. The retention member 16 further includes a generally circular top channel or aperture 68. Aperture 68 has a diameter 70 which is substantially identical to the diameter 32 of the tip 28 of cathode 12. In this manner, when member 16 is attached to cathode holder 14, tip 28 extends through aperture 68 and the outer annular surface of tip 28 contacts the surface 72 which defines aperture 68. Furthermore, when member 16 is attached to cathode holder 14, the "top" inner surface 65 of member 16 abuttingly engages shoulder 33, as shown best in FIG. 3, thereby preventing the cathode 12 from being ejected from the cathode holder 14. It should be appreciated that in alternate embodiments, cathode 12 and/or retention ridge or shoulder 33 may be of a different shape or configuration.

In operation, cathode 12 is fitted into cavity 36 and retention member 16 is screwed tightly onto cathode holder 14. During operation of the spray gun, the extreme amounts of heat generated at the cathode 12 are efficiently dissipated from the cathode 12 through holder 14 and through the retention member 16. Heat is dissipated from cathode 12 by way of several different surfaces. Particularly, heat is dissipated from the shoulder 33 of cathode 12 to the surface 65 of member 16 at juncture 76, from the outer surface of cathode tip 28 to the inner surface 72 of member 16 at juncture 74, from the outer surface of cathode portion 26 to cathode holder 14 at juncture 78, and from the bottom surface of cathode portion 26 to the cathode holder 14 at juncture 80.

Because member 16 and cathode holder 14 are made from different materials and the material of member 16 has a lower coefficient of thermal expansion than holder 14, member 16 will not loosen after repeated thermal cycling. Furthermore, the engagement between shoulder 33 and surface 65 of member 16 provides a positive retention mechanism which substantially prevents cathode 12 from being ejected from holder 14. Importantly, the threading engagement of the retention member and the holder 14 allows the cathode 12 to be relatively easily and quickly replaced. The cathode assembly 10 further provides more contact surface area from which heat can be dissipated from the cathode 12 relative to prior designs. That is, the cathode retention member 16 provides an additional two heat dissipating junctures 74, 76 from which heat can be removed from cathode 12. These features also allow the overall diameter, length and size of the cathode 12 to be desirably increased, thereby improving the thermal management characteristics of the cathode assembly 10 and increasing the life of cathode 12. For example and without limitation, the retention member 14 allows the cathode tip 28 to extend a significant distance outside of the cathode holder 14 and provides two additional surfaces at which heat may be dissipated from the cathode 12. The cathode assembly 10 will also reduce production downtime and increase production efficiency due to the increased cathode life and ability for quick replacement of the cathode 12.

It is to be understood that the invention is not to be limited to the exact construction and/or method which has been illustrated and discussed above, but that various changes and/or modifications may be made without departing from the spirit and the scope of the invention.

What is claimed is:

1. A cathode assembly for use in an electric arc apparatus, said cathode assembly comprising:

a cathode holder having a cathode retention cavity;

a cathode having a first portion of a first diameter which is disposed within said cathode retention cavity, a second portion having a second diameter and which extends from said first portion, and a shoulder portion which is disposed between said first portion and said second portion, wherein said first portion abuts said cathode retention cavity at a bottom surface and along an outer surface; and a retention member which is removably secured to said cathode holder and which includes a first aperture through which said second portion of said cathode abuttingly engages and extends and a first inner surface which engages said shoulder portion, effective to retain said cathode within said cavity.

2. The cathode assembly of claim 1 wherein said cathode is generally cylindrical.

3. The cathode assembly of claim 2 wherein first diameter is larger than said second diameter.

4. The cathode assembly of claim 3 wherein second diameter of said cathode is substantially identical to the diameter of said first aperture.

5. The cathode assembly of claim 1 wherein said cathode is manufactured from a tungsten material.

6. The cathode assembly of claim 5 wherein said cathode holder is manufactured from a brass material.

7. The cathode assembly of claim 4 wherein said retention member is made from a steel material.

8. The cathode assembly of claim 1 wherein said retention member is threadingly secured to said cathode holder.

9. The cathode assembly of claim 1 wherein said cathode holder further includes a bottom portion having a channel for selectively receiving pressurized gas, and several apertures which communicate with said channel and which allow said received pressurized gas to be emitted in a vortex stream from said channel.

10. A cathode assembly for use in an electric arc spray apparatus, said cathode assembly comprising:

a cathode holder having a first cavity;

a cathode having a first generally cylindrical portion which resides within said first cavity, a second generally cylindrical portion which extends from said first portion, and an annular ridge which is formed at a junction of said first portion and said second portion on an outer surface of said cathode, wherein said first portion abuts said first portion along a cylindrical surface and along a bottom surface; and a generally hollow retention cap which is threadingly attached to said cathode holder and which includes a first aperture through which said second generally cylindrical portion of said cathode abuttingly engages and extends and a first surface which abuttingly engages said annular ridge, effective to retain said cathode within said cavity and to dissipate heat from said cathode.

11. The cathode assembly of claim 10 wherein said cathode holder is made of a first material having a first coefficient of thermal expansion and wherein said retention cap is made of a second material having a second coefficient of thermal expansion which is smaller than said first coefficient of thermal expansion.

12. The cathode assembly of claim 11 wherein said second material comprises steel.

13. The cathode assembly of claim 12 wherein said first material comprises brass.

14. The cathode assembly of claim 11 wherein said first generally cylindrical portion has a first diameter and wherein said second generally cylindrical portion has a second diameter which is smaller than said first diameter.

15. The cathode assembly of claim 10 wherein said annular ridge is formed at the juncture of said first portion and said second portion.

16. A method for retaining a cathode within an electric arc spray apparatus, said method comprising the steps of:

providing a cathode holder having a cavity for holding said cathode;

attaching said cathode holder to said electric arc spray apparatus;

forming a shoulder portion on said cathode;

fitting said cathode within said cavity such that said cathode abuts said cavity along a bottom surface and an outer peripheral surface and a tip portion of said cathode extends from said cavity;

providing a generally hollow retention member having a first aperture; and removably securing said retention member to said cathode holder, effective to cause said tip portion of said cathode to abuttingly engage and extend through said aperture and to cause a first surface of said retention member to engage said shoulder, thereby retaining said cathode within said cathode holder.

17. The method of claim 16 further comprising the steps of:

forming first threads on an outer surface of said cathode holder;

forming second threads on an inner surface of said retention member; and selectively engaging said second threads with said first threads, thereby securing said retention member to said cathode holder.

18. The method of claim 17 wherein said retention member comprises a hexagonal outer surface.

19. The method of claim 17 wherein said cathode is manufactured from a thermionic emitting material.

20. The method of claim 19 wherein said cathode holder is manufactured from a first heat dissipating material.

21. The method of claim 20 wherein said cathode holder is manufactured from a second heat dissipating material which has a lower coefficient of thermal expansion relative to said first heat dissipating material.

* * * * *